United States Patent
Ishibashi et al.

(10) Patent No.: US 8,679,337 B2
(45) Date of Patent: Mar. 25, 2014

(54) HOLLOW FIBER MEMBRANE MODULE WITH COVERED MEMBRANE OUTER PERIPHERY

(75) Inventors: Yuzuru Ishibashi, Tokyo (JP); Shuichi Nakata, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 74 days.

(21) Appl. No.: 12/993,291

(22) PCT Filed: Jun. 3, 2009

(86) PCT No.: PCT/JP2009/060170
§ 371 (c)(1),
(2), (4) Date: Nov. 18, 2010

(87) PCT Pub. No.: WO2009/148088
PCT Pub. Date: Dec. 10, 2009

(65) Prior Publication Data
US 2011/0062074 A1 Mar. 17, 2011

(30) Foreign Application Priority Data
Jun. 4, 2008 (JP) ................................. 2008-146758

(51) Int. Cl.
*B01D 63/00* (2006.01)
*B01D 39/00* (2006.01)

(52) U.S. Cl.
USPC ................ 210/321.8; 210/321.6; 210/321.88; 210/500.23

(58) Field of Classification Search
USPC ......... 210/321.6, 321.8, 321.88, 500.23, 321, 210/89, 231; 96/4–10
See application file for complete search history.

(56) References Cited

U.S. PATENT DOCUMENTS

| | | | |
|---|---|---|---|
| 4,179,380 A | | 12/1979 | Amicel et al. |
| 4,966,699 A | * | 10/1990 | Sasaki et al. ............... 210/321.8 |
| 5,143,612 A | * | 9/1992 | Hamanaka et al. ........ 210/321.8 |
| 6,290,756 B1 | * | 9/2001 | Macheras et al. ................... 96/8 |
| 7,578,940 B2 | * | 8/2009 | Hashimoto et al. ........... 210/636 |
| 7,704,394 B2 | * | 4/2010 | Hashimoto et al. ...... 210/321.89 |

(Continued)

FOREIGN PATENT DOCUMENTS

| | | |
|---|---|---|
| CN | 1962038 A * | 11/2005 |
| CN | 101076392 | 11/2007 |

(Continued)

OTHER PUBLICATIONS

Search report from E.P.O., mail date is Feb. 28, 2012.

(Continued)

*Primary Examiner* — Ana Fortuna
(74) *Attorney, Agent, or Firm* — Greenblum & Bernstein, P.L.C.

(57) ABSTRACT

The present invention provides a hollow fiber membrane module having fixing layers to which one or more hollow fiber membrane bundles each including a plurality of hollow fiber membranes are fixed at respective ends thereof using a casting resin, a hollow portion of each of the hollow fiber membranes being open at one or both of the ends, wherein the hollow fiber membrane bundle is divided into a plurality of small bundles at least one of the fixing layers on the open side of the hollow portion, and an outer circumference of each of the small bundles is covered with an elastic body near a filtration portion interface of the fixing layer.

22 Claims, 7 Drawing Sheets

(56) References Cited

U.S. PATENT DOCUMENTS

| | | | |
|---|---|---|---|
| 2002/0011443 A1* | 1/2002 | Komatsu et al. | 210/650 |
| 2006/0157400 A1 | 7/2006 | Hashimoto et al. | |
| 2008/0116128 A1* | 5/2008 | Hashimoto et al. | 210/321.89 |
| 2009/0218274 A1* | 9/2009 | Sakashita et al. | 210/321.6 |
| 2010/0206805 A1* | 8/2010 | Chen et al. | 210/500.23 |
| 2012/0074054 A1* | 3/2012 | Burr et al. | 210/323.2 |

FOREIGN PATENT DOCUMENTS

| | | |
|---|---|---|
| EP | 1 344 542 | 9/2003 |
| EP | 1 994 976 | 11/2008 |
| JP | 48-006988 | 1/1973 |
| JP | 62-119942 | 7/1987 |
| JP | 05-115549 | 5/1993 |
| JP | 5-74626 | 10/1993 |
| JP | 06-21730 | 3/1994 |
| JP | 06-178918 * | 6/1994 |
| JP | 10-290832 | 11/1998 |
| JP | 11-179162 | 7/1999 |
| JP | 11-197461 | 7/1999 |
| KR | 200510117722 * | 11/2005 |
| WO | 2004-112944 | 12/2004 |
| WO | 2007/080910 | 7/2007 |

OTHER PUBLICATIONS

China Office action, mail date is Nov. 9, 2012.

* cited by examiner

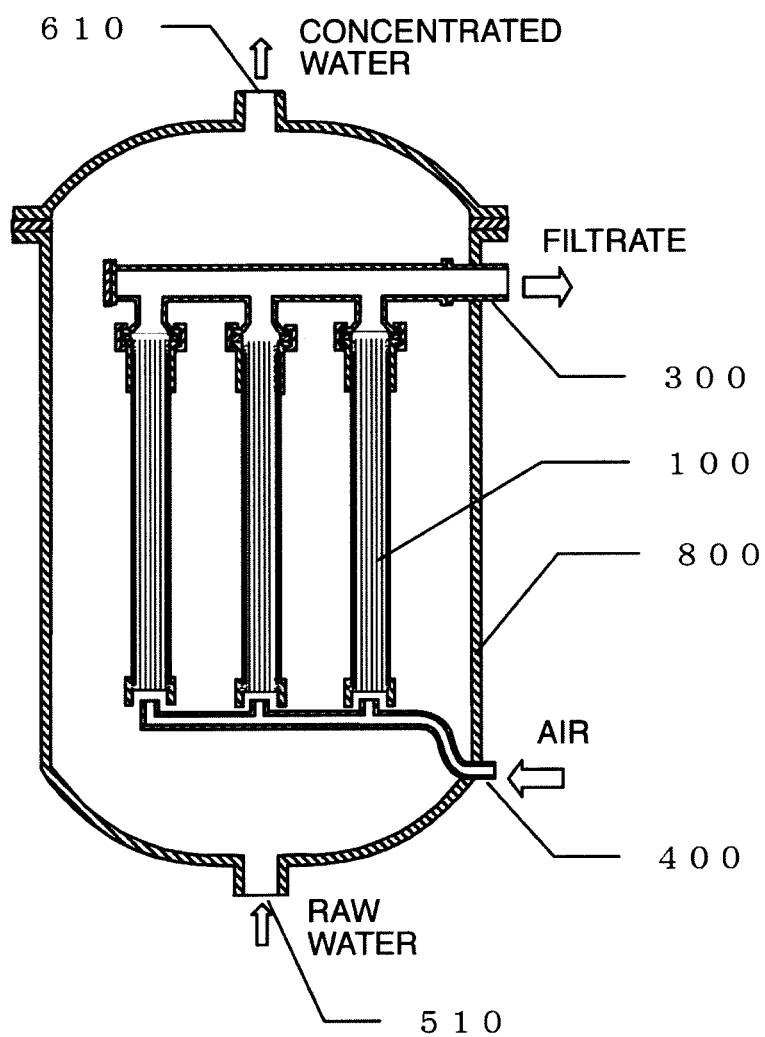

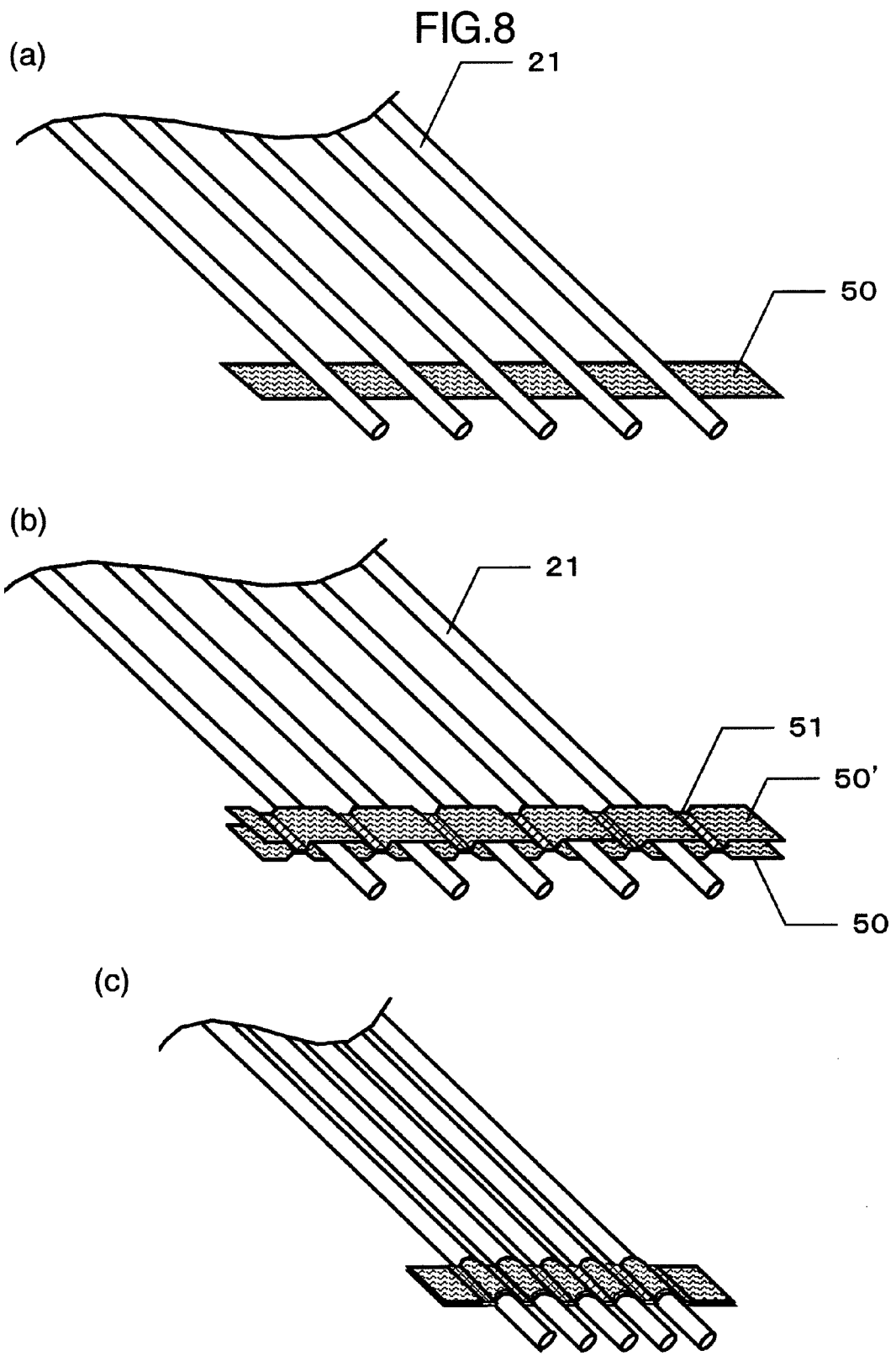

HOLLOW FIBER MEMBRANE MODULE WITH COVERED MEMBRANE OUTER PERIPHERY

TECHNICAL FIELD

The present invention relates to a filtration module using hollow fiber membranes installed in an apparatus provided in a container such as a tank or a bath for aeration and filtration. More specifically, the present invention relates to a filtration module using hollow fiber membranes used for a filtration apparatus performing clarification or sterilization on raw water such as river water, lake water, ground water, seawater, living sewage, industrial waste water, or sewage secondary treatment water, or a membrane bioreactor (MBR) using membranes to perform liquid-solid separation on activated sludge.

BACKGROUND ART

Waste water treatment methods include a membrane bioreactor method of immersing a filtration module in an activated sludge tank and allowing the filtration module to separate activated sludge from treated water by means of filtration, that is, performing liquid-solid separation. This method allows the filtration treatment to be achieved so as to significantly increase the concentration of activated sludge (MLSS: Mixed Liquor Suspended Solid) from 5,000 mg/l to 20,000 mg/l. The method thus has the advantage of allowing the volume of the activated sludge tank to be reduced or enabling the time required for reaction in the activated sludge tank to be reduced. Since the filtration is performed using membranes, no suspended solids (SS) are mixed into the treated water, thus eliminating the need for a final sedimentation tank. This advantageously enables a reduction in the ground-floor area of a treatment facility. Furthermore, the filtration can be achieved regardless of how activated sludge settles out. This allows the burden of activated sludge management to be reduced. Because of the large number of advantages described above, the membrane bioreactor has recently been prevailing rapidly.

If hollow fiber membranes are used for the filtration module, the strength of the membranes themselves prevents the surface of each of the membranes from being damaged upon coming into contact with foreign matter from raw water. The filtration module can thus last for a long period. Such a filtration module further has the advantage of being capable of back washing in which a medium such as treated water is ejected in a direction opposite to the filtration direction to remove attachments from the membrane surface. However, if an aggregate of activated sludge accumulated in the gap between the hollow fiber membranes or the foreign matter from the raw water (hereinafter referred to as suspended solids) is not removed during the filtration, effective membrane area may decrease. This may disadvantageously reduce filtration efficiency, thus preventing stable filtration over a long period.

Aeration is conventionally performed from the bottom of the module in order to avoid accumulating suspended solids on the surfaces of the hollow fiber membranes or between the hollow fiber membranes. Thus, based on the vibration effect of the hollow fiber membranes and a stirring effect associated with upward movement of bubbles, the suspended solids are peeled off from the surfaces of the hollow fiber membranes or from between the hollow fiber membranes to prevent the accumulation. For example, a skirt is installed at the bottom of the hollow fiber membrane module, with a plurality of through-holes formed in a skirt-side fixing layer. Thus, aeration is performed from the bottom of the skirt to form a gas-liquid mixture layer in the end of the skirt projecting from the skirt. Thus, bubbles are generated evenly through the plurality of through-holes to allow the suspended solids accumulated on the outer surfaces of the hollow fiber membranes to be easily peeled off.

However, when activated sludge with a high MLSS is filtered as in the case of the membrane bioreactor, in a bundle of hollow fiber membranes located close to a head, the suspended solids entrained in a gas-liquid multiphase flow may fail to pass completely through the bundle of the hollow fiber membranes. Then, the suspended solids may disadvantageously accumulate gradually.

To solve these problems, a method has been proposed in which hollow fiber membranes are divided into a plurality of small bundles at the interface of an upper fixing portion so that the small bundles are arranged at a specific distance from one another (see WO 2004-112944).

CITATION LIST

Patent Literature

[Patent Literature 1] WO2004-112944

SUMMARY OF INVENTION

Problem to be Solved by the Invention

When the above-described hollow fiber membrane module is immersed in an activated sludge tank and a filtering operation is performed over a long period, suspended solids may accumulate in the bundles of the hollow fiber membranes near the fixing portions of the small bundles resulting from the division. The diameter of each of the small bundles may thus increase gradually to reduce the distance between the small bundles. This may disadvantageously prevent the suspended solids from being properly removed from the module, thus degrading filtration performance.

Furthermore, the hollow fiber membranes may be broken near the interface of the fixing portion under the effect of a violent gas-liquid multiphase flow caused by continuous aeration. Then, raw water may disadvantageously be mixed into filtrate to degrade the quality of the filtrate. In the prior art, to inhibit the hollow fiber membranes from being broken near the interface of the fixing portion, a flexible resin layer is provided on the interface of the fixing portion (see, for example, WO 2004-112944). However, even with this method, the hollow fiber membranes may be broken in connection with handling of the module or operation over a long period. Thus, the conventional filtration modules need to be improved.

An object of the present invention is to provide a hollow fiber membrane module inhibiting suspended solids from accumulating in hollow fiber membranes to allow stable filtration performance to be exhibited for a long period.

Means for Solving the Problem

As a result of keen examinations, the present inventors have found that the above-described problems can be solved by covering the outer circumference of hollow fiber membranes with a specific elastic body near the interface of a fixing layer, thus achieving the present invention.

The present invention is as follows.

(1) A hollow fiber membrane module having fixing layers to which one or a plurality of hollow fiber membrane bundles each including a plurality of hollow fiber membranes are fixed at respective ends thereof using a casting resin, a hollow portion of each of the hollow fiber membranes being open at one or both of the ends, wherein the hollow fiber membrane bundle is divided into a plurality of small bundles at least one of the fixing layers on an open side of the hollow portion, and an outer circumference of each of the small bundles is covered with an elastic body near a filtration portion interface of the fixing layer.

(2) A hollow fiber membrane module having fixing layers to which a plurality of hollow fiber membranes are fixed at respective ends thereof using a casting resin, a hollow portion of each of the hollow fiber membranes being open at one or both of the ends, wherein an outer circumference of each of the hollow fiber membranes is covered with an elastic body near a filtration portion interface of at least one of the fixing layers on an open side of the hollow portion.

(3) The hollow fiber membrane module set forth in (1) or (2), wherein a part of the elastic body is buried in the fixing layer, and a remaining part of the elastic body projects from the filtration portion interface of the fixing layer.

(4) The hollow fiber membrane module set forth in any one of (1) to (3), wherein a length by which the elastic body projects from the filtration portion interface is 5 mm or more and 100 mm or less.

(5) The hollow fiber membrane module set forth in (4), wherein the outer circumference of the hollow fiber membrane bundle covered by the elastic body is in tight contact with an inner surface of the portion of the elastic body projecting from the filtration portion interface.

(6) The hollow fiber membrane module set forth in any one of (1) to (5), wherein a distance between elastic bodies closest to each other at the portion projecting from the filtration portion interface is 2 mm or more and 80 mm or less.

(7) The hollow fiber membrane module set forth in any one of (1) to (6), wherein the filtration portion interface of the fixing layer on a side on which the elastic body is provided is inclined to a fiber length direction of the hollow fiber membrane bundles.

(8) The hollow fiber membrane module set forth in any one of (3) to (7), wherein a position of the filtration portion interface of the fixing layer outside the elastic body is closer to a center of the module than a position of a tip of the casting resin coating an outer surface of the hollow fiber membrane in the elastic body.

(9) The hollow fiber membrane module set forth in any one of (1) to (8), wherein the elastic body is shaped like a tube.

(10) The hollow fiber membrane module set forth in any one of (1) to (9), wherein the hollow fiber membrane or the hollow fiber membrane bundle is covered directly with the elastic body.

(11) The hollow fiber membrane module set forth in any one of (1) to (10), wherein the elastic body comprises a heat-shrinkable material.

(12) The hollow fiber membrane module set forth in (11), wherein the heat-shrinkable material exhibits a hardness of 40 A to 90 A after heat shrinkage.

(13) The hollow fiber membrane module set forth in any one of (1) to (12), having no external cylinder covering the outer circumference of the hollow fiber membrane bundles.

(14) An immersion hollow fiber membrane cartridge module using the hollow fiber membrane module set forth in any one of (1) to (13).

(15) A pressurization hollow fiber membrane cartridge module using the hollow fiber membrane module set forth in any one of (1) to (13).

Advantages of the Invention

In the hollow fiber membrane module according to the present invention, the outer circumference of the hollow fiber membrane or the hollow fiber membrane bundle is covered. This enables the significant inhibition of the situation in which suspended solids accumulate between the hollow fiber membranes or in the hollow fiber membrane bundles to degrade filtration performance. The present invention can also prevent the hollow fiber membranes from being damaged. The hollow fiber membrane module can thus exhibit high and stable filtration performance over a long period. Furthermore, the hollow fiber membranes are covered with the specific heat-shrinkable material. This allows the hollow fiber membrane module to be easily and efficiently manufactured. The hollow fiber membranes themselves can also be prevented from being damaged by being rubbed by the cover material. Moreover, the position of the filtration portion interface of the fixing layer outside each of the elastic bodies is closer to the center of the module than the position of the tip of the casting resin coating the outer surface of the hollow fiber membrane in the elastic body. This prevents the hollow fiber membranes from being broken in an area where the casting resin coats on the outer surface of the hollow fiber membrane, when the module is subjected to an external force during handling or operation.

(a) A hollow fiber membrane module in which the outer circumference of the hollow fiber membrane bundles is covered with a cage-like cylinder.

(b) A hollow fiber membrane module in which the outer circumference of the hollow fiber membrane bundles is covered with a cylinder with through-holes.

Figure 4:
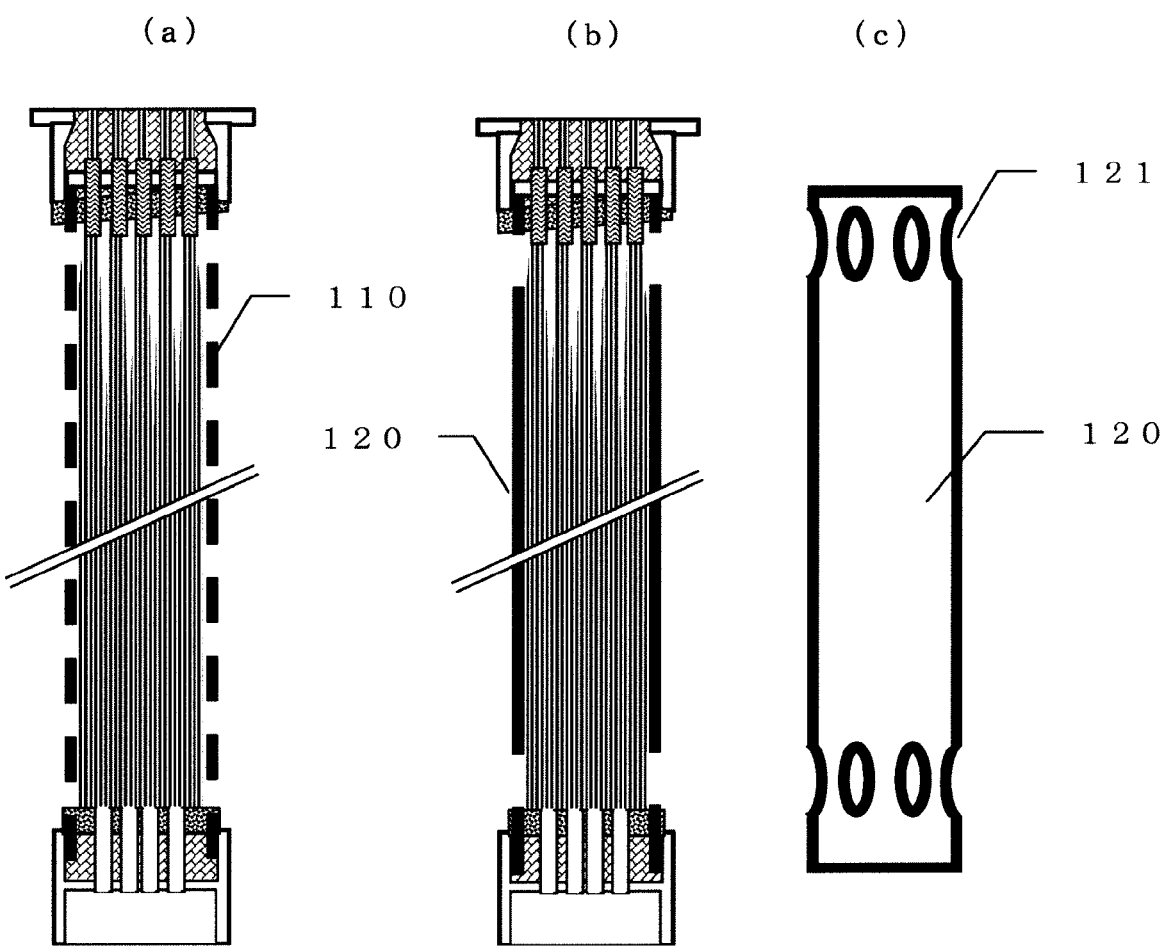
FIG. 4 An example of an embodiment of a hollow fiber membrane module according to the present invention.

(c) A cylinder with the through-holes shown in FIG. 4(b).

Figure 5:
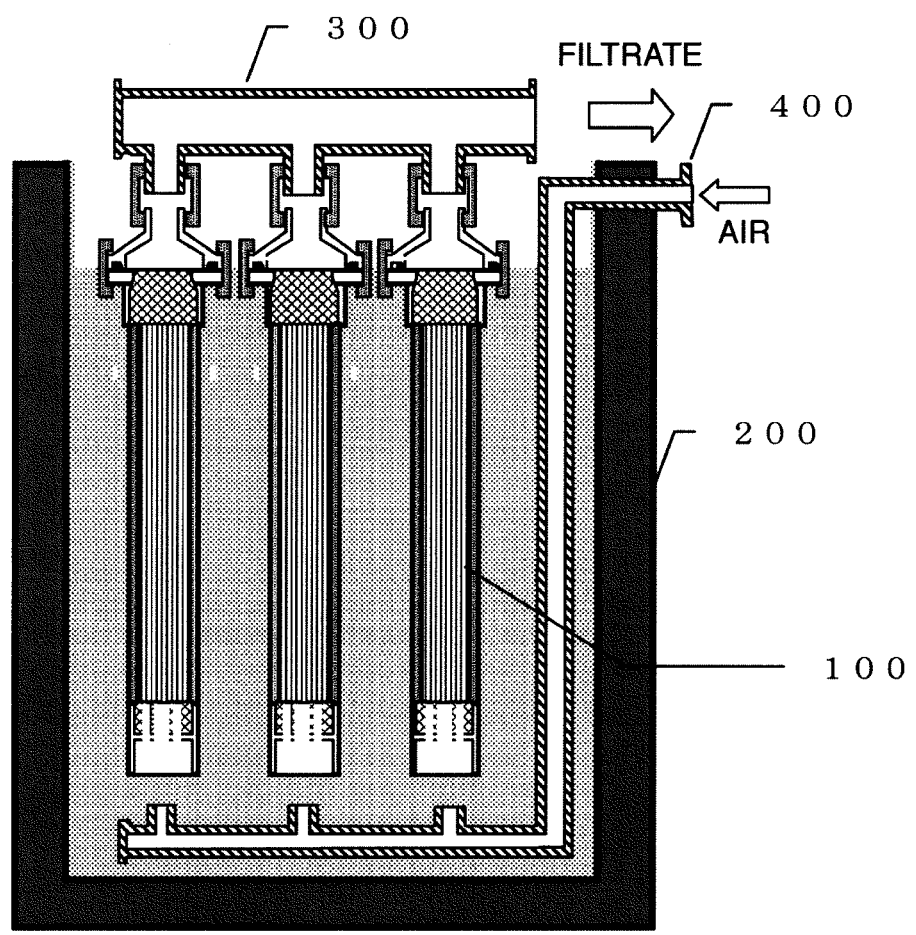

FIG. 5 A diagram illustrating an example of how an immersion hollow fiber membrane cartridge module is utilized.

Figure 6:
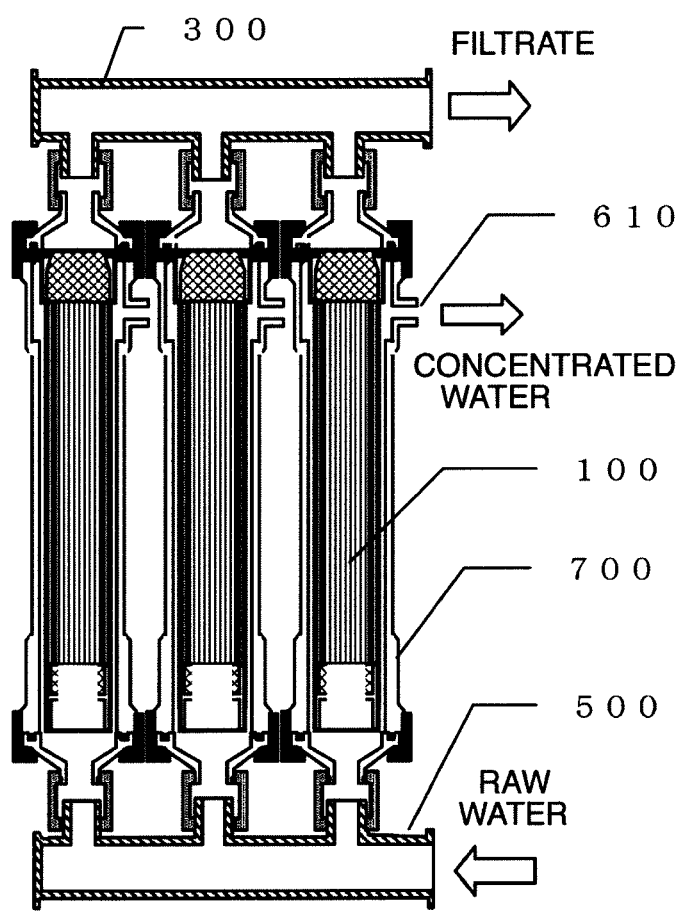

FIG. 6 A diagram illustrating an example of how a pressurization hollow fiber membrane cartridge module is utilized.

FIG. 7 A diagram illustrating another example of how the pressurization hollow fiber membrane cartridge module is utilized.

FIG. 8 A diagram illustrating an example of manufacture of a hollow fiber membrane bundle with the outer circumference of each of hollow fiber membranes covered with a heat-shrinkable film.

(a) An example of the stage in which the hollow fiber membranes have been set on the heat-shrinkable film.

(b) An example of the stage in which another heat-shrinkable film has been set on the hollow fiber membranes in FIG. 8(a) and the heat-shrinkable films are fused between the hollow fiber membranes.

(c) An example of a stage after the structure in FIG. 8(b) has been heated.

MODE FOR CARRYING OUT THE INVENTION

In a hollow fiber membrane module according to the present invention, a plurality of hollow fiber membranes are fixed at the opposite ends thereof using a casting resin. The hollow portion of each of the hollow fiber membranes is open at one or both of the ends. That is, the present invention includes a hollow fiber membrane module installed in the vertical direction and configured as described below. (1) On the upper side of the hollow fiber membrane module, hollow portions are open, and in the lower side thereof, the hollow portions are closed. Permeated water can be collected through the upper openings. (2) The hollow portion is open on both the upper and lower sides of the hollow fiber membrane module. Permeated water can be connected through both the upper and lower openings. (3) The hollow fiber membranes are U-shaped. On the upper side of the hollow fiber membrane module, the hollow portions at the opposite ends are open. Permeated water can be collected through the upper openings.

In the specification, the "hollow fiber membrane module" means a filtration element installed in a filtration apparatus for use and including hollow fiber membranes and fixing portions to which the ends of the hollow fiber membranes are fixed. An "immersion hollow fiber membrane cartridge module" means a hollow fiber membrane module installed in a filtration apparatus immersed in a tank filled with raw water and performing filtration by means of suction. A "pressurization hollow fiber membrane cartridge module" means a hollow fiber membrane module inserted into a pressurization container installed in a filtration apparatus, to perform filtration by means of pressurization. The pressurization container includes a type (rack type) in which one module is inserted into one container and a type (tank type) in which a plurality of modules are inserted into one container.

An example of an embodiment of an immersion cartridge module using hollow fiber membranes according to the present invention will be described below with reference to FIG. 1.

The immersion cartridge module using the hollow fiber membranes according to the present invention has a hollow fiber membrane bundle 1 (the hollow fiber membrane module according to the present invention may have one or more hollow fiber membrane bundles, but in the present embodiment, the module has only one hollow fiber membrane bundle) made up of a plurality of hollow fiber membranes, and a head 2 and a skirt 3 provided at respective ends of the hollow fiber membrane bundle 1. The hollow fiber membranes are fixed by a head-side first fixing layer 4 and a skirt-side first fixing layer 5.

Each of the hollow fiber membranes is open at a head-side end thereof (head-side first fixing layer end surface 6). A hollow portion of the hollow fiber membrane is sealed at a skirt-side end thereof (skirt-side first fixing layer end surface 7).

A portion of the hollow fiber membrane which is not located inside the fixing layers at the respective ends of the module is called a filtration portion 12. A portion of the head-side fixing layer which faces the filtration portion is defined as a filtration portion interface of the head-side fixing layer. A portion of the skirt-side fixing layer which faces the filtration portion is defined as a filtration portion interface of the skirt-side fixing layer. The head-side fixing layer may be made up of one or more layers. When the head-side fixing layer is made up of two layers as in the example shown in FIG. 1, the filtration portion 12-side layer is referred to as a head-side second fixing layer, and the end surface 6-side layer is referred to as a head-side first fixing layer. The skirt-side fixing layer may also be made up of one or more layers. When the skirt-side fixing layer is made up of two layers as in the example shown in FIG. 1, the filtration portion 12-side layer is referred to as a skirt-side second fixing layer, and the end surface 7-side layer is referred to as a skirt-side first fixing layer. The head-side first fixing layer 4 and the head-side second fixing layer 13 as a whole are simply referred to as a "head-side fixing layer". The skirt-side first fixing layer 5 and the skirt-side second fixing layer 14 as a whole are simply referred to as a "skirt-side fixing layer". A portion of the head-side second fixing layer which faces the filtration portion is referred to as the position 13' of the filtration portion interface of the head-side fixing layer. A portion of the skirt-side second fixing layer which faces the filtration portion is referred to as the position 14' of the filtration portion interface of the skirt-side fixing layer.

The skirt 3 includes a skirt end 9 projecting from the skirt-side first fixing layer end surface 7. A plurality of through-holes 8 are formed in the skirt-side fixing layer.

The through-holes 8 allow raw water and cleaning gas to be introduced into the hollow fiber membrane bundle and come into effective contact with the outer circumferential surface of the hollow fiber membrane.

The hollow fiber membrane bundle 1 is divided into a plurality of small bundles 10 in the head-side fixing layer. In general, in the hollow fiber membrane module according to the present invention, the hollow fiber membrane bundle may be divided into a plurality of small bundles at any positions other than the head-side fixing layer.

The head 2 and the skirt 3 are coupled together by a support material 11. The support material 11 has the function of preventing the skirt 3 from being raised or twisted during aeration. Specifically, the function can be fulfilled by fixedly coupling the head-side first fixing layer 4 and the skirt-side first fixing layer 5 together via one of a pipe, a bar, a plate, a chain, a string, and a net.

The diameter of the hollow fiber membrane module is preferably 30 mm to 800 mm and more preferably 100 mm to 800 mm. The length of the hollow fiber membrane module is preferably selected from the range from 300 mm to 3,000 mm.

Materials for the head 2, skirt 3, and a porous plate 16 used in the present invention are not particularly limited and may be the same or different. However, a thermoplastic resin or stainless steel is preferably used. The head 2 serves as a fixing portion allowing the hollow fiber membrane module to hang in a container. The head 2 is thus shaped to a hanging and fixing structure. For example, a step or a groove or a threaded portion may be formed in the outer circumferential portion of the head 2. Examples of a method for hanging the hollow fiber membrane module in the container include a tank scheme in which modules are fixed to separation plates separating a tank in the vertical direction and a rack scheme in which modules are fixed to branch pipes branching from a main pipe. Either of them can be preferably used in the present invention.

In connection with the pore size of the hollow fiber membrane, reverse osmosis membranes, ultrafilter membranes, and even microfiltration membranes may be used in the present invention. A material for the hollow fiber membrane is not particularly limited but may be polysulfone, polyethersulfone, polyacrylonitrile, polyimide, polyetherimide, polyamide, polyetherketone, polyetheretherketone, polyethylene, polypropylene, poly-4-methylpentene, cellulose, cellulose acetate, polyvinylidene fluoride, a polyethylene-tetrafluoroethylene copolymer, polytetrafluoroethylene, or the like. Alternatively, the membrane may be composed of a combination of any of these materials. The preferred shape of the hollow fiber membrane is such that the inner diameter is 50 pun to 3,000 μm and the inner/outer diameter ratio is 0.3 to 0.8.

The hollow fiber membrane module according to the present invention may include one or more hollow fiber membrane bundles 1 as described above. When the hollow fiber membrane module includes a plurality of the hollow fiber membrane bundles 1, all of the hollow fiber membrane bundles may each be divided into a plurality of small bundles or some of the hollow fiber membrane bundles may not be divided into a plurality of small bundles. When the hollow fiber membrane module includes only one hollow fiber membrane bundle 1, the hollow fiber membrane bundle may be divided into a plurality of small bundles.

To increase the filling factor of the hollow fiber membranes, while allowing suspended solids to be easily removed, the hollow fiber membranes effectively have a sparse portion near the head-side fixing layer so as to provide a channel through which the suspended solids are discharged. That is, an effective structure is such that the hollow fiber membrane bundle is divided into a plurality of small bundles so that the area between the hollow fiber membrane bundles serves as a channel for aeration bubbles and the suspended solids.

In each of the small bundles 10 of the hollow fiber membranes in the head-side fixing layer, the distance between the closest hollow fiber membranes is preferably less than 2 mm and more preferably less than 1 mm so as to allow an increase in the area of the hollow fiber membranes and in the amount of filtrate provided by the immersion cartridge module. The distance between the hollow fiber membranes as used herein refers to the distance between the outermost surfaces of the hollow fibers. Furthermore, the number of hollow fiber membranes forming each small bundle 10 is preferably 20 or more and 500 or less and more preferably 30 or more and 300 or less. The number within this range significantly reduces the amount of suspended solids accumulated between the hollow fiber membranes. The distance between the closest small bundles is preferably 2 mm or more and 100 mm or less and more preferably 3 mm or more and 30 mm or less. With a distance within this range, there is no particular accumulation of suspended solids, thus allowing an increase in the filling factor of the hollow fiber membranes and in the amount of filtrate. The distance between the small bundles as used herein refers to the shortest distance between the outermost surface of each of the hollow fiber membranes included in one small bundle and the outermost surface of each of the hollow fiber membranes included in the other small bundle.

In the small bundles 10 of the hollow fiber membranes at the filtration portion-side interface of the head-side fixing layer, the distance between the closest hollow fiber membranes in each of the small bundles 10 is preferably less than 2 mm and more preferably less than 1 mm so as to allow an increase in the area of the hollow fiber membranes and in the amount of filtrate provided by the hollow fiber membrane module. The distance between the hollow fiber membranes as used herein refers to the distance between the outermost surfaces of the hollow fibers. Furthermore, the number of hollow fiber membranes forming each small bundle 10 is preferably 10 or more and 1,000 or less and more preferably 20 or more and 300 or less. The number within this range significantly reduces the amount of sludge deposit accumulated between the hollow fiber membranes. The distance between the closest small bundles is preferably 2 mm or more and 100 mm or less and more preferably 3 mm or more and 30 mm or less. With a distance within this range, there is no particular accumulation of sludge deposits, thus allowing an increase in the filling factor of the hollow fiber membranes and in the amount of filtrate. The distance between the small bundles as used herein refers to the shortest distance between the outeiniost surface of each of the hollow fiber membranes included in one small bundle and the outermost surface of each of the hollow fiber membranes included in the other small bundle.

When the small bundles 10 of the hollow fiber membranes at the filtration portion interface of the head-side fixing layer are arranged on one or more concentric circles, aeration bubbles can be evenly discharged in the circumferential direction. This is expected to effectively remove suspended solids with a minimum amount of aeration.

Provided that the number of the hollow fiber membranes included in each small bundle 10 falls within the above-described ranges, the number of the hollow fiber membrane in one small bundle may be the same as or different from that in another small bundle. However, to allow suspended solids to be effectively discharged, preferably, the number of the hollow fiber membranes included in the small bundle is the same for all the small bundles and/or the small bundles are arrayed on the concentric circle at even intervals.

The small bundles are present in all directions from the central portion toward circumferential portion of the concentric circle of the filtration portion interface of the head-side fixing layer. This prevents the flow of aeration from being limited to some directions from the central portion toward circumferential portion of the module. Thus, the suspended solids can be evenly removed. That is, the central portion of the filtration portion interface of the head-side fixing layer is invisible from the outside of the module, or any line drawn from the center toward the outer circumference of the concentric circle passes through the hollow fiber membrane bundle in any cases. Thus, the flow of aeration is prevented from being limited to some directions from the central portion toward circumferential portion of the module, allowing suspended solids to be effectively removed.

To allow the small bundles of the hollow fiber membranes to be fixed to predetermined positions to maintain an appropriate inter-bundle distance, the small bundles are inserted into through-holes formed in the porous plate 16. Preferably, the through-holes in the porous plate 16 are formed at the positions corresponding to the arrangement of the above-described hollow fiber membrane bundles. Preferably, the hole diameter of the through-hole is equivalent to or 1 to 2 mm larger than the outer diameter of each hollow fiber membrane bundle inserted into the through-hole.

In the present invention, the skirt 3 preferably projects downward from the end surface of the hollow fiber membrane and is fixed to the outer circumference of the hollow fiber membrane bundle. Although depending on the diameter of the hollow fiber membrane module, the amount of air supplied, and the diameter and number of the through-holes, the length by which the skirt 3 projects from the end surface is preferably 5 mm to 300 mm in order to prevent possible dissipation of air. An excessively large length increases the overall length of the hollow fiber membrane module, resulting in a useless space. This is not preferable. An excessively small length causes air supplied to the module to dissipate in a lateral direction instead of being effectively guided to the through-holes. This is also not preferable.

The through-holes 8 in the skirt-side fixing layer according to the embodiment of the present invention are formed in the fixing layer itself. As the size of the hole, the equivalent diameter is selected from the range from 2 mm to 30 mm. The shape of the through-holes 8 is selected from a polygon such as a triangular, a rectangle, or a hexagon, a circle, an ellipse, a fan shape, a C shape, and a star shape. Furthermore, although depending on the cross section of the hollow fiber membrane module or the number of fibers, the number of the holes may be 2 to 300. The holes are preferably evenly distributed over the cross section of the skirt-side fixing layer; the positions of the holes correspond to, for example, the intersecting points between multiple circles and radial lines, the intersecting points in a lattice, or the vertices of many equilateral triangles on the cross section of the fixing layer.

Bubbles passing through the plurality of through-holes in the skirt-side fixing layer rise almost vertically through voids between the hollow fiber membranes while vibrating the hollow fiber membrane bundle 1. However, the hollow fiber membrane bundle 1 is vibrated insignificantly near the head-side fixing layer, reducing the voids. The bubbles thus fail to rise and diffuse toward the circumference to move out of the module. If the filling factor of the membranes is increased to reduce the intervals between the hollow fiber membranes, suspended solids contained in a treatment target liquid fail to pass through the hollow fiber membranes. The suspended solids thus remain between the hollow fiber membranes, thus reducing filtration area. This makes filtration difficult.

As a casting resin used to form the fixing layers according to the present invention, a well-known thermoplastic resin or a well-known thermosetting resin may be used. However, in terms of the operation of manufacture, two-component thermosetting resin is particularly preferred. Specific examples of such a resin include a polymer material such as an epoxy resin, a urethane resin, an epoxy acrylate resin, or a silicone resin. As a casting method, a well-known one such as a centrifugal casting method or a stationary casting method may be used. To improve the curing shrinkage and bonding strength of the casting resin, the casting resin may contain a fiber-like substance such as glass fiber or carbon fiber, or fine powder such as carbon black, alumina, or silica.

Desirably, the resin for the head-side first fixing layer 4 fixes the hollow fiber membranes together and the hollow fiber membranes and the inner wall of the head together in a liquid tight manner. Desirably, the resin can withstand the differential pressure between the filtration portion 12 side and the end surface 6 side during filtration. Thus, the hardness of the resin is preferably 20D or more and 80D or less and more preferably 30D or more and 70D or less (a method for measuring the hardness complies with JISK6253 or ISO7619; this also applies to the description below). A hardness of 20D or more provides a sufficient mechanical strength to allow the fixation to the hollow fiber membranes to be maintained over a long period. A hardness of 80D or less reduces the possibility that the resin forming the fixing layer and the inner wall of the head is peeled off from each other or a crack occurs in the fixing layer, when the hollow fiber membranes are fixed in the head.

The second fixing layer (head-side second fixing layer 13) is preferably provided on the filtration portion side of the head-side first fixing layer in contact with the head-side first fixing layer. The resin for the head-side second fixing layer may be the same as that for the above-described head-side first fixing layer but is preferably more flexible so as to reduce possible stress concentration at the interface of the head-side second fixing layer. The hardness of the resin is preferably 20 A or more and 90 A or less and more preferably 40 A or more and 80 A or less.

The resin for the skirt-side first fixing layer 5 has only to fix the hollow fiber membranes together or the hollow fiber membranes and the inner wall of the skirt together and to be prevented from being destroyed by vibration of the hollow fiber membranes or the like. The resin may be the same as that for the head-side first fixing layer 4 or that for the skirt-side second fixing layer 14 described below.

The resin for the filtration portion interface of the skirt-side fixing layer (the resin for the skirt-side second fixing layer 14 in FIG. 1) is desirably a flexible material so as to relieve possible stress resulting from the vibration of the hollow fiber membranes to prevent the hollow fiber membranes from being broken. The hardness of the resin is preferably 20 A or more and 90 A or less and more preferably 40 A or more and 80 A or less. A hardness of 20 A or more provides a sufficient mechanical strength to allow the fixation to the hollow fiber membranes to be maintained over a long period. A hardness of 90 A or less allows the relief of possible stress at the filtration portion interface resulting from the vibration of the hollow fiber membranes, thus reducing the possibility of breakage of the hollow fiber membranes.

When on the head or skirt side, a resin layer with a relatively high hardness (first fixing layer) is provided and a resin layer with a low hardness (second fixing layer) is provided on the filtration portion side of the first fixing layer in contact with the first fixing layer, it is possible to use, for example, a method of forming the first fixing layer using an epoxy resin with a high hardness and then forming a silicon resin layer on the filtration portion side of the epoxy layer, or a method of forming the first fixing layer using a urethane resin with a high hardness and then forming a urethane resin layer with a low hardness on the filtration portion side of the first fixing layer. The latter method is particularly preferred in terms of productivity for manufacture.

In the present invention, the outer circumference of each of the hollow fiber membranes or the hollow fiber membrane bundles is covered with an elastic body 15 at the filtration portion interface at least of the head-side fixing layer. The coverage with the elastic body exerts the following two effects. (1) The distance between the hollow fiber membranes or the hollow fiber membrane bundles can be maintained constant. Channels can thus be maintained through which suspended solids in the treatment target water are discharged. This allows the suspended solids to be prevented from being accumulated. (2) When the hollow fiber membranes are fixed using the casting resin, the casting resin acts to climb because of the interfacial tension thereof, thus forming a coating layer of the casting rein on the outer surface of the hollow fiber membranes. If such a hollow fiber membrane module is applied to a membrane bioreactor, the hollow fiber membranes are likely to be broken at the tip of the coating layer formed. Furthermore, if the casting resin is relatively hard, an external force applied to the coating portion is likely to cause the hollow fiber membranes to be broken together with the coating layer. The possible breakage of the hollow fiber membranes as described above can be prevented by covering the outer circumference of each of the hollow fiber membranes or the hollow fiber membrane bundles with the elastic body near the filtration portion interface of the fixing layer.

The elastic body 15 in the present invention refers to a polymeric substance that is deformed when subjected to a force but returns to the original size when the load is removed. The elastic body preferably has a hardness of 20 A to 90 A (a method for measuring the hardness complies with JISK6253 or ISO7619). A hardness of 20 A or more provides a sufficient mechanical strength to allow the shape to be maintained over a long period. A hardness of 90 A or less reduces the possibility that the hollow fiber membranes are damaged. The module used for the membrane bioreactor is exposed to a violent gas-liquid multiphase flow for a long time. Thus, the elastic body particularly preferably has a hardness of 40 A to 90 A.

Preferably, a part of the above-described elastic body is buried in the fixing layer, with the remaining part projecting from the filtration portion interface of the fixing layer. Thus, the hollow fiber membranes can be effectively prevented from being broken at the filtration portion interface of the hollow fiber membranes and at the coating portion or the tip thereof.

The length by which the elastic body projects from the filtration portion interface is preferably 5 mm or more and 100 mm or less. A length of 5 mm or more allows channels for a gas-liquid multiphase flow containing a large amount of suspended solids to be maintained. Thus, the module can be safely operated over a long period. Furthermore, a length of 100 mm or less reduces a decrease in the area of the hollow fiber membranes in the filtration portion. This reduces the impact on the filtration performance. In particular, the length is preferably 10 mm or more and 60 mm or less. This range enables the above-described coating portion to be reliably located in the elastic body, thus allowing the hollow fiber membranes to be effectively prevented from being broken. Additionally, channels are ensured to allow suspended solids to be effectively prevented from being accumulated.

Figure 2:
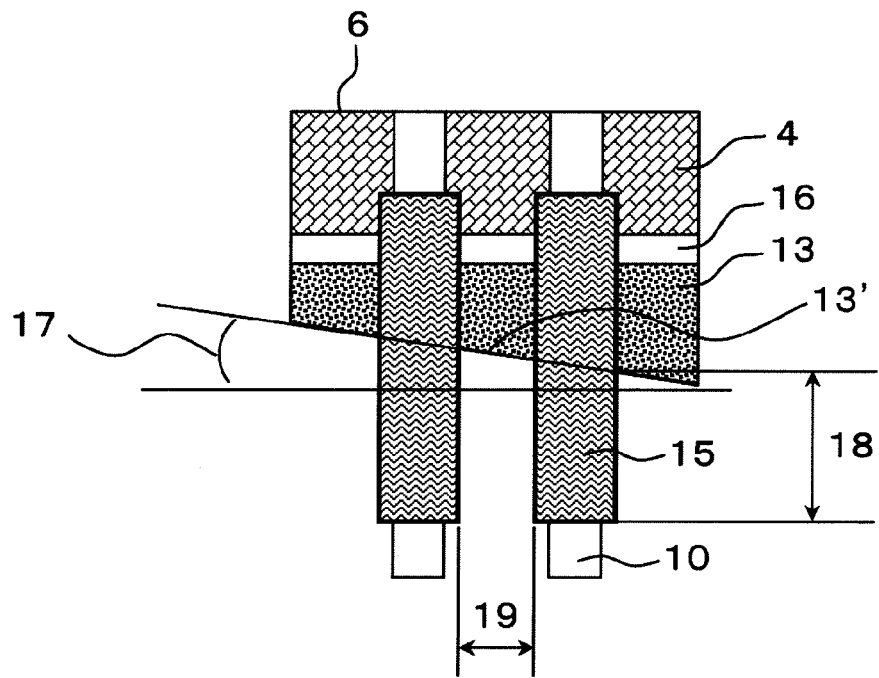
FIG. 2 A section view of a head portion of an immersion cartridge module showing an example of the inclination of a filtration portion and the characteristics of an elastic body according to the present invention.

If the filtration portion interface of the fixing layer is inclined, the length of the portion exposed from the fixing layer may vary depending on the position on the circumference of each elastic body. In this case, the smallest length is determined to be the "projection length". If a plurality of the elastic bodies are present in one hollow fiber membrane module, the projection length of each elastic body preferably falls within the above-described range. An example in which the second fixing layer is inclined as shown in FIG. 2 will be described. For the elastic body 15 shown on the right side of FIG. 2, the length of the portion exposed from the second fixing layer is smallest on the right side of FIG. 2. For this elastic body, the exposed portion 18 on the right side of FIG. 2 is determined to be the "projection length" of the elastic body.

Preferably, in the portion of the above-described elastic body projecting from the filtration portion interface, the inner surface of the elastic body is in tight contact with the outer circumference of the hollow fiber membranes or hollow fiber membrane bundle covered by the elastic body. If the inner surface of the elastic body is not in tight contact with the outer circumference, the hollow fiber membrane is violently vibrated when exposed to the gas-liquid multiphase flow. Thus, the inner surface of the elastic body or the inner edge of the tip thereof rubs the hollow fiber membrane, which may thus be damaged. In contrast, if the inner surface of the elastic body is in tight contact with the outer circumference, the hollow fiber membrane is prevented from being moved inside the elastic body. The hollow fiber membrane is thus prevented from being damaged.

In the portion projecting from the filtration portion interface, the distance 19 between the closest elastic bodies is preferably 2 mm or more and 80 mm or less. A distance of 2 mm or more reduces the possibility that sludge accumulates between the elastic bodies and ensures channels. Thus, the module can operate stably over a long period. Furthermore, a distance of 80 mm or less reduces a decrease in the area of the hollow fiber membranes in the filtration portion. This reduces the impact on the filtration performance. The preferred distance is 3 mm or more and 30 mm or less.

The filtration portion interface of the head-side fixing layer is preferably inclined to a plane perpendicular to the fiber length direction of the hollow fiber membrane bundle. An example in which the second fixing layer is inclined as shown in FIG. 2 will be described. The head-side second fixing layer 13 with the elastic bodies 15 partly buried therein is inclined to the length direction of the small bundles 10 of the hollow fiber membranes. In the present invention, the angle of the filtration portion interface 13' to the plane (in FIG. 2, a horizontal plane) perpendicular to the length direction of the small bundles 10 is defined as the "angle of inclination 17". The angle of inclination is preferably 0.5° or more and 20° or less. More preferably, the angle of inclination is 1° or more and 10° or less. The inclination allows the direction of the gas-liquid multiphase flow to be controlled to one side. In a filtration apparatus, a large number of hollow fiber membrane modules are often arranged in two rows for use. In this case, suspended solids in the whole apparatus can be properly discharged by directing the gas-liquid multiphase flow toward the outside of each of the rows. The maximum value of the angle of inclination is preferably set so as to avoid affecting the membrane area contributing to filtration. Within the above-described ranges, the membrane area is substantially prevented from being affected, allowing the flow to be effectively controlled.

The above-described inclination can be provided by the following method when the fixing layer is formed using the casting resin.

(1) For the centrifugal casting method, the angle of inclination is determined by the balance between centrifugal force and gravity. On the other hand, the centrifugal force is determined by the position (turning radius) of the fixing layer in the module and a rotation speed (RPM). Thus, the angle of inclination can be set by appropriately setting the rotation speed according to the position of the fixing layer in the module. (2) For the stationary casting method, the inclination can be provided by fixing the hollow fiber membranes such that the hollow fiber membranes are inclined to the vertical direction.

Figure 3:
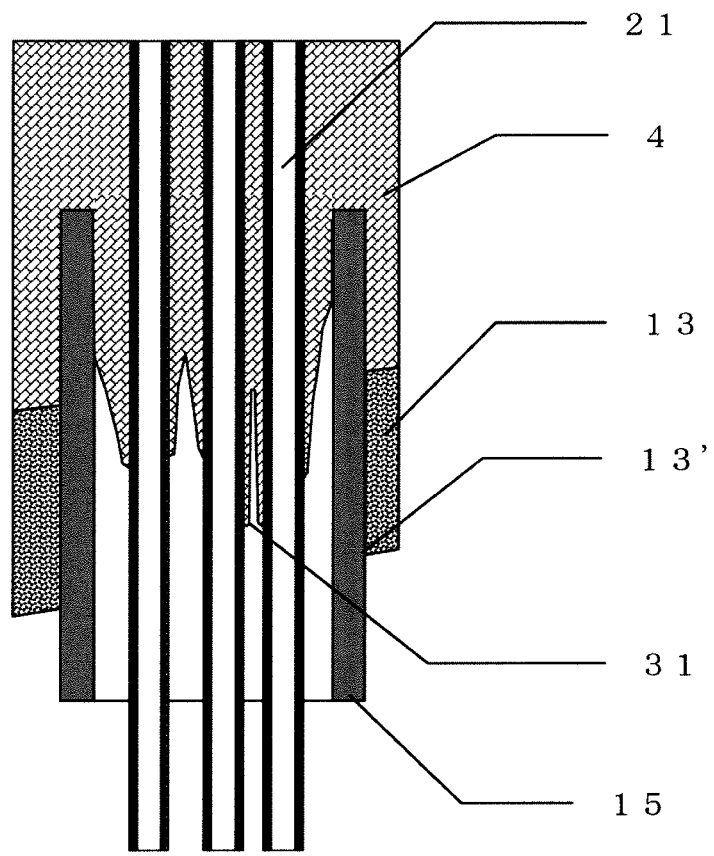
FIG. 3 A diagram illustrating the positional relationship between a cover portion composed of the elastic body and a coating portion of a casting resin.

The position of the filtration portion interface of the fixing layer outside the elastic body is preferably closer to the center of the module than the position of the tip of the casting resin coating the outer surface of the hollow fiber membrane in the elastic body. This will be described with reference to FIG. 3. The outer circumference of a bundle of hollow fiber membranes 21 is covered with the elastic body 15, and the first fixing layer 4 is formed using a first casting resin. In this case, the first casting resin climbs in the gap between the hollow fiber membranes to form a coating layer. The "position of the filtration portion interface of the fixing layer outside the elastic body is closer to the center of the module than the position of the tip of the casting resin coating the outer surface of the hollow fiber membrane in the elastic body" means that the position of the tip 31 of the coating layer located closest to the center of the module is closer to the first fixing layer than the position 13' of a portion of the filtration portion interface of the second fixing layer 13 formed outside the elastic body 15 which portion is close to the head-side first fixing layer (the position 13' is located on the right side of FIG. 3). In this condition, even if a force is applied to the elastic body perpendicularly to the length direction of the hollow fiber membranes, no force is exerted on the portion of the casting resin (the portion of the coating layer) coating the outer surface of each of the hollow fiber membranes inside the elastic body. This prevents the hollow fiber membranes from being broken at this portion.

In this case, the same casting resin may be used as materials for the head-side first fixing layer and the head-side second fixing layer. However, a casting resin with a lower hardness (that is, a more flexible casting resin) is more preferably used as the material for the second fixing layer in order to reduce the possible stress concentration on the elastic body at the interface of the head-side second fixing layer. The hardness of the casting resin for the second fixing layer is preferably 20 A or more and 90 A or less and more preferably 40 A or more and 80 A or less.

The above-described elastic body may be shaped like a tube, or a sheet or a film (the elastic body is hereinafter simply described to be shaped like a film). If the elastic body is shaped like a tube, the hollow fiber membrane or the hollow fiber membrane bundle is inserted into the tube and fixed using the casting resin. Furthermore, if the elastic body is shaped like a film, the elastic body is wound around the outer circumference of the hollow fiber membrane or the hollow fiber membrane bundle to form an overlapping portion. The overlapping portion is heated and fused or bonded using an adhesive and then fixed using the casting resin. For a hollow fiber membrane module with at most 100 hollow fiber membrane bundles per module, the tube-like elastic body is preferably used. The tube-like elastic body advantageously eliminates the need for a step of heating and fusing the elastic body or bonding the elastic body using an adhesive. Furthermore, the junction is prevented from being peeled off or damaged during use. On the other hand, if every hollow fiber membrane is covered with the elastic body, the elastic body is preferably shaped like a film. The film-like elastic body enables the elastic body to be consecutively wound around and joined to the consecutively manufactured hollow fiber membranes. The film-like elastic body is thus suitable for mass production.

A material for the elastic body is selected with the characteristics of raw water and resistance to chemicals used for a filtration operation taken into account. Examples of the material include polyolefin-containing elastomers such as ethylene-propylene rubber (EPDM) and nitrile-butadiene rubber, polyurethane-containing elastomers, polyamide-containing elastomers, polyester-containing elastomers, olefin-containing resins such as polyethylene, vinyl-chloride-containing resins, fluorine-containing resins, and silicon-containing resins. In particular, the polyolefin-containing elastomers, olefin-containing resins, and silicon-containing resins are preferred in terms of flexibility and chemical resistance.

Furthermore, the above-described elastic body may be homogeneous or may be a foam or a bubble sheet with internal closed cells, or a porous body with internal open cells.

The above-described elastic body is particularly preferably made up of a heat-shrinkable material. An elastic body made up of a heat-shrinkable material is placed so as to surround the hollow fiber membrane or the hollow fiber membrane bundle and then heated. Then, the outer circumference of the hollow fiber membrane or the hollow fiber membrane bundle can be covered with the elastic body so that the elastic body is in tight contact with the hollow fiber membrane or the hollow fiber membrane bundle. The tight contact prevents the hollow fiber membrane from moving in the elastic body during the filtration operation. This in turn prevents the hollow fiber membrane from being damaged. After the temperature is returned to the ordinary one, the elastic body remains in tight contact with the hollow fiber membrane. The shape of the elastic body is fixed with no clamping force exerted on the hollow fiber membrane. Since no clamping force is exerted on the hollow fiber membrane, the hollow fiber membrane is prevented from being damaged by the clamping force.

Alternatively, a heat-shrinkable material separate from the elastic body may be used, and the hollow fiber membrane or the hollow fiber membrane bundle may be covered with the elastic body by placing the elastic body around the hollow fiber membrane or the hollow fiber membrane bundle, placing the heat-shrinkable material around the outer circumference of the elastic body, and heating and shrinking the heat-shrinkable material. However, the heat-shrinkable material exerts only a weak shrinkage force upon being shrunk under heat. It is thus difficult to deform the elastic body by the shrinkage force to tightly contact the elastic body with the outer circumference of the hollow fiber membrane or the hollow fiber membrane bundle. Thus, the type of the elastic body is significantly limited, and a porous body with a porosity of 70% or more, for example, urethane sponge, is used. If such an easily deformable elastic body is used, the hollow fiber membrane may move in the elastic body even after the shrinkage of the heat-shrinkable material. If such a hollow fiber membrane module is used in a condition in which after the shrinkage of the heat-shrinkable material, the membrane may be violently vibrated by aeration as in the case of the membrane bioreactor, the hollow fiber membrane may be rubbed in the elastic body and damaged. It is thus important to select the thickness of the elastic body or the type or size of the heat-shrinkable material depending on how easily the elastic body used is deformed. Furthermore, the elastic body and the heat-shrinkable material need to be fixed to respective predetermined positions. This operation is cumbersome. In contrast, if the elastic body is made up of a heat-shrinkable material, the above-described two disadvantages are eliminated.

If the elastic body is made up of the heat-shrinkable material, the elastic body preferably exhibits a hardness of 20 A to 90 A after heat shrinkage. (The method for measuring the hardness complies with JISK6253 or ISO7619.) A hardness of 20 A or more provides a sufficient mechanical strength to allow the shape to be maintained over a long period. A hardness of 90 A or less reduces the possibility that the hollow fiber membranes are damaged. The module used for the membrane bioreactor is exposed to a violent gas-liquid multiphase flow for a long time. Thus, the elastic body particularly preferably has a hardness of 40 A to 90 A. As the heat-shrinkable material, a well-known tube-, film-, or sheet-like material (the "film or sheet-like" heat-shrinkable material is hereinafter simply referred to as the heat-shrinkable "film") may be used. However, the material is selected taking into account the characteristics of raw water and the resistance to the chemicals used during the filtration operation. Examples of the preferred material include heat-shrinkable tube materials such as a EPDM-containing heat-shrinkable tube, an olefin-containing heat-shrinkable tube, a silicone-containing heat-shrinkable tube, a PVC-containing heat-shrinkable tube, and a polyurethane-containing heat-shrinkable tube, and heat-shrinkable films such as an olefin-containing heat-shrinkable film, a polyurethane-containing heat-shrinkable film, and a polyester-containing heat-shrinkable film. In particular, the EPDM-containing heat-shrinkable tube, the olefin-containing heat-shrinkable tube, the silicone-containing heat-shrinkable tube, and the olefin-containing heat-shrinkable film are preferred in terms of flexibility and chemical resistance. Furthermore, in the manufacture of a module with at most 100 hollow fiber membrane bundles per module, the above-described heat-shrinkable tube is preferred because the tube can be easily inserted into the hollow fiber membrane bundle. The EPDM-containing heat-shrinkable tube is particularly preferred because the tube is easily stuck to the casting resin such as an epoxy resin or a urethane resin which forms the fixing portion.

The above-described heat-shrinkable material is preferably shrunk when heated to 50° C. to 150° C. The heat-shrinkable material is particularly preferably shrunk when heated to 50° C. to 120° C. The temperature within this range does not affect the characteristics of the hollow fiber membranes.

The inner diameter of the above-described heat-shrinkable tube (the inner diameter before shrinkage) is desirably determined with the following taken into account: the outer diameter of the hollow fiber membrane or hollow fiber membrane bundle covered with the heat-shrinkable material and the maximum heat shrinkage factor of the heat-shrinkable tube. That is, the inner diameter of the heat-shrinkable tube is preferably larger than the outer diameter of the hollow fiber membrane or the hollow fiber membrane bundle because this facilitates the insertion operation. On the other hand, (the outer diameter of the hollow fiber membrane or the hollow fiber membrane bundle) (the inner diameter before shrinkage)×(1−(maximum shrinkage factor)/100) is preferably set so that the shrunk heat-shrinkable tube comes into tight contact with the outer circumference of the hollow fiber membrane or hollow fiber membrane bundle covered with the tube. Specifically, the inner diameter before shrinkage is preferably at least 1.05 times and at most triple and more preferably at least 1.1 times and at most twice, as large as the outer diameter of the hollow fiber membrane or the hollow fiber membrane bundle.

An example of a method of covering the hollow fiber membrane or the hollow fiber membrane bundle with the heat-shrinkable material will be described below.

A hollow fiber membrane bundle can be covered with a heat-shrinkable, elastic tube (hereinafter simply referred to as an elastic tube) as follows.

(1) A predetermined number of hollow fiber membranes each with the end thereof heated and fused to occlude the hollow portion are assembled into a hollow fiber membrane bundle. (2) The hollow fiber membrane bundle is inserted into the elastic tube, which is then placed on a tray at a predetermined position. (3) The tray is placed in an oven and heated to a predetermined temperature so that the tube is shrunk. These operations bring the elastic body into tight contact with the hollow fiber membrane bundle at a predetermined portion. (4) The hollow fiber membrane bundle covered with the elastic tube as described above is placed in a module head member at a predetermined position using a porous plate or the like. (5) A casting resin (first casting resin) is injected into the head member to fix the hollow fiber membranes together and the hollow fiber membrane, the tube, and the inner wall of the head together. (6) Once the above-described casting resin loses fluidity, a casting resin (second casting resin) is injected between the tube and the inner wall of the head and then solidified on the interface of the casting resin. (7) The end side of the hollow fiber membranes is cut together with the head member to open the hollow portion of each of the hollow fiber membranes. Thus, the hollow fiber membrane bundle can be produced in which the filtration portion interface on the open side of the hollow fiber membranes is covered with the elastic body made up of the heat-shrinkable tube. In some cases, the above-described step (6) may be omitted.

Now, every hollow fiber membrane can be covered with a heat-shrinkable, elastic film (hereinafter simply referred to as an elastic film) as follows.

(1) The end of the hollow fiber membrane is heated and fused so as to occlude the hollow portion of the hollow fiber membrane. (2) An elastic film 50 with a predetermined width and a predetermined length is placed on a tray. (3) A predetermined number of hollow fiber membranes 21 are arranged parallel to one another at predetermined intervals so that a predetermined portion of each of the hollow fiber membranes 21 lies on the film 50. This condition is shown in FIG. 8(a). (4) Another elastic film 50' is placed on the hollow fiber membranes 21 at a position corresponding to the elastic film 50. (5) Heaters are applied to the respective outer surfaces of the two elastic films at the intermediate portion of each of the hollow fiber membranes. The two elastic films 50 and 50' are then heated and fused to form fused portions 51. Thus, each of the hollow fiber membranes is surrounded by the elastic films 50 and 50'. This condition is shown in FIG. 8(b). (6) The tray as a whole is placed in an oven and heated to a predetermined temperature. The elastic films are thus shrunk. These operations bring the elastic films into tight contact with the outer circumference of each of the hollow fiber membranes. This condition is shown in FIG. 8(c). (7) An operation similar to that for the above-described elastic tube is then performed. As a result, the hollow fiber membrane bundle can be produced in which the filtration portion interface on the open side of the hollow fiber membranes is covered with the elastic body made up of the heat-shrinkable film.

As described above, in producing the hollow fiber membrane module according to the present invention using the heat-shrinkable material, the step of the heating treatment for shrinkage is preferably carried out before the casting step. This allows the elastic body to tightly contact the outer circumference of the hollow fiber membrane or the hollow fiber membrane bundle at the filtration portion interface of the fixing layer and near the filtration side thereof. Thus, the hollow fiber membranes can be effectively prevented from being damaged. Furthermore, carrying out the shrinking step before the casting step allows the hollow fiber membranes or the hollow fiber membrane bundles to be easily arranged at predetermined positions at predetermined intervals for the casting step.

Furthermore, each of the hollow fiber membranes or hollow fiber membrane bundles is preferably covered directly with the above-described elastic body. The "direct coverage" means that the hollow fiber membrane or the hollow fiber membrane bundle is covered directly with the elastic body with no coverage target between the elastic body and the hollow fiber membrane or the hollow fiber membrane bundle. In particular, if the hollow fiber membrane or the hollow fiber membrane bundle is covered directly with the above-described heat-shrinkable material, the hollow fiber membrane or the hollow fiber membrane bundle can be prevented from being damaged at the tip of the heat-shrinkable material. This preferably avoids excessive clamping of the hollow fiber membrane or the hollow fiber membrane bundle after heat shrinkage.

Figure 1:
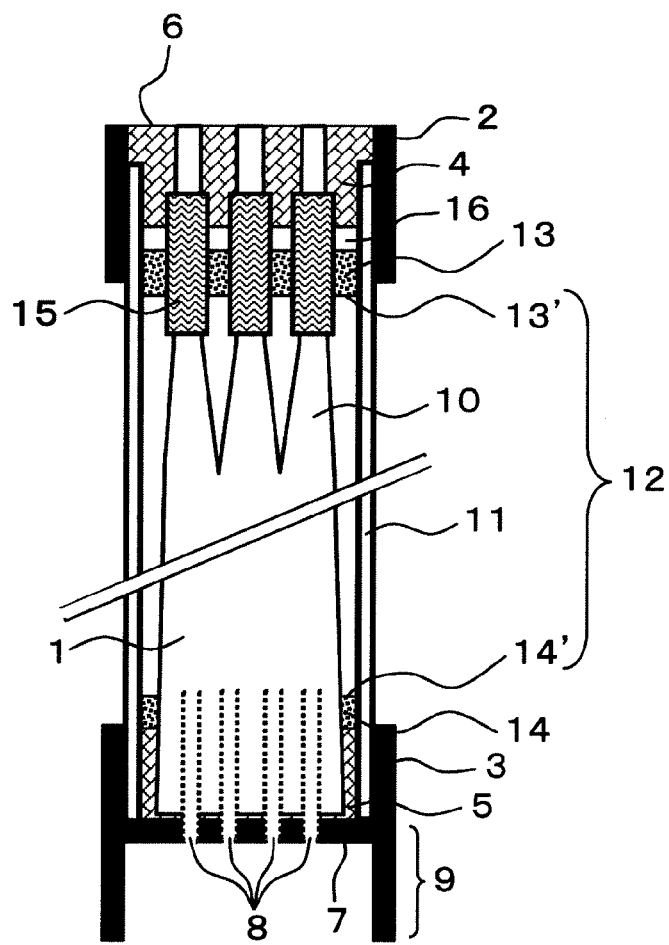
FIG. 1 A sectional view illustrating an example of an embodiment of an immersion cartridge module using hollow fiber membranes according to the present invention.

Possible embodiments of the hollow fiber membrane module according to the present invention include not only a type having no external cylinder covering the outer circumference of the hollow fiber membrane bundle as shown in FIG. 1 but also a type covering the outer circumference of the hollow fiber membrane bundle with a cage-like cylinder 110 as shown in FIG. 4(a) and a type covering the outer circumference of the hollow fiber membrane bundle with a cylinder 120 with through-holes 121 in a wall as shown in FIGS. 4(b) and 4(c). A module of the type having no external cylinder covering the outer circumference of the hollow fiber membrane bundle enables the hollow fiber membranes to spread widely during aeration for preventing suspended solids from accumulating. This type thus prevents the suspended solids from accumulating and can therefore be suitably used for the membrane bioreactor. On the other hand, a module of the type covering the outer circumference of the hollow fiber membrane bundle with the cage-like cylinder or the cylinder with the through-holes is suitable for pressurized filtration in which the module is housed in a pressurization container. Since the hollow fiber membranes are covered with the cage-like cylinder or the cylinder with the through-holes, the hollow fiber membranes can be effectively prevented from being damaged when housed in the pressurization container.

The hollow fiber membrane module according to the present invention can be utilized for, for example, the membrane bioreactor as shown in FIG. 5. That is, in this type, the open side of the hollow portion in each hollow fiber membrane module 100 is connected to a collection line 300. The hollow fiber membrane modules 100 are immersed in a water tank 200 open to the atmosphere, to perform suction filtration. In this type, an air induction line 400 for aeration is located below the hollow fiber membrane modules 100.

Alternatively, the hollow fiber membrane modules according to the present invention may be housed in a pressurization container, and the interior of the container may be pressurized to perform filtration (this type is hereinafter referred to as a pressurization type). The pressurization type is suitable for filtering raw water containing a relatively small amount of suspended solids. The pressurization type is further classified into a type in which one hollow fiber membrane module is housed in one pressurization container for use (rack type) and a type in which a plurality of hollow fiber membrane modules are housed in one container for use (tank type). An example of the former type is shown in FIG. 6. An example of the latter type is shown in FIG. 7.

In FIG. 6, each of the hollow fiber membrane modules 100 is housed in a module case 700 and connected to the collection line 300 and a raw water supply line 500 via connection members. A nozzle is provided on the upper part of the side of the module case 700 to discharge suspended solids to the exterior of the module. In this type, an air introduction line (not shown in the drawings) can be connected to a connection line at the bottom of each of the modules to introduce air into the module. Thus, the suspended solids in the module can be discharged. Furthermore, in FIG. 7, a plurality of the hollow fiber membrane modules 100 are housed in a pressurization tank 800, and the open side of the hollow portion in each of the hollow fiber membrane modules 100 is connected to the collection line 300 via a connection member. Additionally, an air introduction line 400 for aeration is located below the hollow fiber membrane modules. A raw water supply port 510 and a concentrated water discharge port 610 are formed on the pressurization tank 800. The interior of the pressurization tank is pressurized to filter raw water through the hollow fiber membranes. The filtrate is collected via the collection line 300.

EXAMPLES

Examples of the present invention will be described below. However, the examples do not limit the present invention. In the examples, a comparative example, and a referential example, the hardness was measured using a durometer (model name "Durometer WR-202NA" manufactured by NISHI TOKYO SEIMITSU).

Example 1

An example of an immersion hollow fiber membrane cartridge module will be described in which heat-shrinkable tubes are used as elastic bodies to cover respective small bundles of hollow fiber membranes.

The heat-shrinkable tube used was made of EPDM (product name "NISHITUBE": model name "NPM-65-20-1" manufactured by NISHI NIPPON ELECTRIC WIRING & CABLE CO., LTD.). Before shrinkage, the heat-shrinkable tube exhibited an inner diameter of 20 mm and a thickness of 1 mm. When heated to 100° C., the heat-shrinkable tube exhibited a maximum shrinkage factor of about 50% in the circumferential direction.

The opposite ends of each of the hollow fiber membranes are fixed by a centrifugal casting method using a urethane resin. The hollow fiber membrane module produced had a membrane area of 25 m$^2$ and was cylindrical. The hollow fiber membrane was a microfiltration membrane made of polyvinylidene fluoride and having a pore size of 0.1 µm. The hollow fiber membrane had an outer diameter of 1.2 mm, an inner diameter of 0.7 mm, and an effective length of 2,000 mm.

The hollow fiber membrane was divided into 30 bundles with 0.83 m$^2$ per bundle (110 membranes per bundle). Each bundle was inserted into a heat-shrinkable tube having a length of 50 mm so that the portion of 90 mm from the end of the hollow fiber membrane bundle was exposed from the tube. The heat-shrinkable tube was shrunk in a hot air dryer at 100° C. for 10 minutes. The heat-shrunk tube exhibited a hardness of 70 A.

A porous plate shaped like a flat plate and having a thickness of 10 mm was used to arrange the small bundles on concentric circles at intervals of 3 mm. In the head-side fixing layer, the hollow fiber membranes were installed in the form of small bundles using the porous plate. In the skirt-side fixing layer, the hollow fiber membranes were installed in the form of a single bundle.

Twenty-eight through-holes of 11 mmφ were formed in the end surface of the skirt-side fixing layer on concentric circles. A urethane resin (exhibiting a hardness of 50D after curing) was used to form a first fixing layer by the centrifugal casting method. Thereafter, a urethane resin (exhibiting a hardness of 65 A after curing) was injected into the filtration portion side of the first fixing layer. The urethane resin was then cured in a stationary condition to form a second fixing layer. Elastic bodies covering the respective hollow fiber membrane bundles had a minimum length of 20 mm from the filtration portion interface of the head-side second fixing layer. The minimum distance between the elastic bodies was 3 mm. The angle of inclination of the interface of the head-side second fixing layer was 3 degrees.

For centrifugal casting, the head-side fixing layer and the skirt-side fixing layer were coupled and fixed using, as a support material, a pipe made of stainless steel SUS304 and having an outer diameter of 13 mm.

The module was immersed in an activated sludge tank with a volume of 8 m$^3$. A head cap and a filtrate line were connected together and fixed to the activated sludge tank.

Aeration was performed at 6 Nm$^3$/hr through the through-holes in the end surface of the skirt-side fixing layer. At the same time, a suction pump was used to perform suction filtration so that a membrane filtration flow velocity was 0.6 m$^3$/membrane area m$^2$/day. At this time, the transmembrane pressure difference was −15 to −20 kPa, and the module was successfully safely operated for three months. Three months later, no sludge was found to adhere to the hollow fiber membranes. The weight of the hollow fiber membrane module including adhering sludge increased by 300 g compared to that measured at the beginning of the filtration. Fiber breakage did not occur near the head-side second fixing layer.

Furthermore, three months later, the minimum distance between the elastic bodies was 3 mm and thus remained unchanged. No sludge accumulated between the elastic bodies, and the projection length from the filtration portion interface remained unchanged for all the elastic bodies. Moreover, fiber breakage was not observed.

During the filtration operation, the concentration MLSS in the activated sludge tank was 10,000 mg/l on an average, and the average temperature was 25° C. Municipal wastewater with an average BOD of 150 mg/l and an SS of 160 mg/l was used as raw water for activated sludge.

Example 2

A hollow fiber membrane module was produced in the same manner as in Example 1 except that the formation of the second fixing layer using the second casting resin (urethane resin with a hardness of 65 A) was omitted only on the head side. The elastic bodies in the hollow fiber membrane had a minimum length of 25 mm from the filtration portion interface of the head-side first fixing layer. The minimum distance between the elastic bodies was 3 mm. The angle of inclination of the head-side first fixing layer was 2 degrees.

The module was immersed in an activated sludge tank with a volume of 8 m³. A head cap and a filtrate line were connected together and fixed to the activated sludge tank.

Aeration was performed at 6 Nm³/hr through the through-holes in the end surface of the skirt-side fixing layer. At the same time, a suction pump was used to perform suction filtration so that the membrane filtration flow velocity was 0.6 m³/membrane area m²/day. At this time, the transmembrane pressure difference was −15 to −20 kPa, and the module was successfully safely operated for three months. Three months later, no sludge was found to adhere to the hollow fiber membranes. The weight of the hollow fiber membrane module including adhering sludge increased by 300 g compared to that measured at the beginning of the filtration. Fiber breakage did not occur near the head-side first fixing layer.

Furthermore, three months later, the minimum distance between the elastic bodies was 3 mm and thus remained unchanged. No sludge accumulated between the elastic bodies, and the projection length from the filtration portion interface remained unchanged for all the elastic bodies. Moreover, fiber breakage was not observed.

During the filtration operation, the concentration MLSS in the activated sludge tank was 10,000 mg/l on average, and the average temperature was 25° C. Municipal wastewater with an average BOD of 150 mg/1 and an SS of 160 mg/l was used as raw water for activated sludge.

Comparative Example 1

A hollow fiber membrane module was prepared which had exactly the same structure as that in Example 1 except that the small bundles were not covered with the heat-shrinkable tube. The minimum distance between the small bundles was 3 mm.

The above-described hollow fiber membrane module was immersed in the same activated sludge tank as that in Example 1. A filtration operation was then performed.

Aeration was performed at 6 Nm³/hr through the through-holes in the end surface of the skirt-side fixing layer. At the same time, a suction pump was used to perform suction filtration so that the membrane filtration flow velocity was 0.6 m³/membrane area m²/day. In this case, the transmembrane pressure difference was initially −15 to −20 kPa, and three months later, −30 to −35 kPa. The weight of the hollow fiber membrane module including adhering sludge which weight was measured three months later was 800 g heavier than that measured at the beginning of the filtration. Fiber breakage occurred near the head-side second fixing layer.

Furthermore, three months later, the minimum distance between the hollow fiber membrane bundles was 1.5 mm and was shorter than that measured before the beginning of the filtration. Sludge was found to adhere even to the inside of the hollow fiber membrane bundle. The diameter of each of the small bundles was determined to be larger than that measured before the beginning the filtration. Moreover, the position where the appropriate distance between the small bundles was maintained was located 15 mm from the head-side fixing layer before the beginning of the filtration but located 3 mm from the head-side fixing layer three months layer. This evidently indicates that channels were reduced by accumulating sludge.

During the filtration operation, the concentration MLSS in the activated sludge tank was 10,000 mg/l on average, and the average temperature was 25° C. Municipal wastewater with an average BOD of 150 mg/l and an SS of 160 mg/l was used as raw water for activated sludge.

Comparative Example 2

A hollow fiber membrane module was prepared which had exactly the same structure as that in Example 2 except that the small bundles were not covered with the heat-shrinkable tube. The minimum distance between the small bundles was 3 mm.

The above-described hollow fiber membrane module was immersed in the same activated sludge tank as that in Example 1. A filtration operation was then performed.

Aeration was performed at 6 Nm³/hr through the through-holes in the end surface of the skirt-side fixing layer. At the same time, a suction pump was used to perform suction filtration so that the membrane filtration flow velocity was 0.6 m³/membrane area m²/day. In this case, the transmembrane pressure difference was initially −15 to −20 kPa, and three months later, −30 to −35 kPa. The weight of the hollow fiber membrane module including adhering sludge which weight was measured three months later was 800 g heavier than that measured at the beginning of the filtration. Fiber breakage occurred near the head-side first fixing layer.

Furthermore, three months later, the minimum distance between the small bundles was 1.5 mm and was shorter than that measured before the beginning of the filtration. Sludge was found to adhere even to the inside of the hollow fiber membrane bundle. The diameter of each of the small bundles was determined to be larger than that measured before the beginning the filtration. Moreover, the position where the appropriate distance between the small bundles was maintained was located 15 mm from the head-side first fixing layer before the beginning of the filtration but located 3 mm from the head-side fixing layer three months layer. This evidently indicates that channels were reduced by accumulating sludge.

During the filtration operation, the concentration MLSS in the activated sludge tank was 10,000 mg/l on an average, and the average temperature was 25° C. Municipal wastewater with an average BOD of 150 mg/l and an SS of 160 mg/l was used as raw water for activated sludge.

Example 3

One hundred and ten hollow fiber membranes which were the same as those in Example 1 were inserted into an EPDM heat-shrinkable tube (product name "NISHITUBE": model name "NPM-65-20-1" manufactured by NISHI NIPPON ELECTRIC WIRING & CABLE CO., LTD.; length: 50 mm)

The EPDM heat-shrinkable tube was placed in an oven and heated at 100° C. for 10 minutes so as to be shrunk.

The EPDM heat-shrinkable tube was left in a room for 24 hours. The length of the outer circumference of the tube was measured. The length is denoted by L1.

Then, the tip of one hollow fiber membrane located at the outer circumference of the hollow fiber membrane bundle was tied to a spring balance. The spring balance was pulled perpendicularly to the length direction of the tube to apply a load of 400 g to the hollow fiber membrane. Ten seconds later, the load was released. In this case, when the load was applied, the tip of the tube was deformed while keeping tight contact with the hollow fiber membrane. When the load was released, the deformed tip of the tube returned immediately to the original shape while keeping tight contact with the hollow fiber membrane. Furthermore, the site of the hollow fiber membrane abutting against the tip of the tube was found not to be damaged.

Then, the hollow fiber membrane was pulled in the length direction of the tube. The hollow fiber membrane was then successfully pulled out of the tube.

Thereafter, all the hollow fiber membranes were pulled out of the tube. The length of the outer circumference of the tube was measured. This length was defined as L2. L2/L1 was then calculated to be 1.0. This indicates that the hollow fiber membranes were subjected to almost no clamping force after heat shrinkage.

Thereafter, the tubes were cut open in the length direction as described above. A plurality of tubes cut open were stacked to have a thickness of 10 mm or more. In this situation, the hardness thereof was measured and found to be 70 A.

Example 4

An operation similar to that in Example 3 was performed using a polyolefin heat-shrinkable tube (product name "SUMITUBE" SUMI-FZ-25 manufactured by SUMITOMO ELECTRIC FINE POLYMER INC.). The heat-shrinkable tube had an inner diameter of 26 mm and a thickness of 0.4 mm before shrinkage. When heated to 100° C., the heat-shrinkable tube exhibited a maximum shrinkage factor of about 47%.

As a result, when a load of 400 g was applied to the hollow fiber membrane, the tip of the tube was deformed while keeping tight contact with the hollow fiber membrane. When the load was released, the deformed tip of the tube returned immediately to the original shape while keeping tight contact with the hollow fiber membrane. Furthermore, the site of the hollow fiber membrane abutting against the tip of the tube was found not to be damaged.

Then, the hollow fiber membrane was pulled in the length direction of the tube. The hollow fiber membrane was then successfully pulled out of the tube. Thereafter, all the hollow fiber membranes were pulled out of the tube. L2/L1 was then calculated to be 1.0. This indicates that the hollow fiber membranes were subjected to almost no clamping force after heat shrinkage.

The shrunk heat-shrinkable tubes measured 85 A in hardness.

Example 5

An operation similar to that in Example 3 was performed using a soft vinyl-chloride heat-shrinkable tube (product name "HISHITUBE" I-15-0.5 manufactured by Mitsubishi Plastics, Inc.). The heat-shrinkable tube had an inner diameter of 22 mm and a thickness of 0.5 mm before shrinkage. When heated to 100° C., the heat-shrinkable tube exhibited a maximum shrinkage factor of about 37%.

As a result, when a load of 400 g was applied to the hollow fiber membrane, the tip of the tube was deformed while keeping tight contact with the hollow fiber membrane. When the load was released, the deformed tip of the tube failed to return immediately to the original shape. About one hour was required for the tip of the tube to return to the original shape. Furthermore, the site of the hollow fiber membrane abutting against the tip of the tube was collapsed and recessed.

Then, the hollow fiber membrane was pulled in the length direction of the tube. The hollow fiber membrane was then successfully pulled out of the tube. Thereafter, all the hollow fiber membranes were pulled out of the tube. L2/L1 was then calculated to be 1.0. This indicates that the hollow fiber membranes were subjected to almost no clamping force after heat shrinkage.

The shrunk heat-shrinkable tube measured 92 A in hardness.

Example 6

Drop tests were carried out under the assumption that the covered portion of the hollow fiber membrane bundle was subjected to an external impact.

A hollow fiber membrane module produced in the same manner as in Example 1 was laid at its side on the floor surface. A 1-kg steel pipe was dropped onto the tube portion of the module from the position 1 m high. The dropping operation was repeated three times. Thereafter, the hollow fiber membrane module was immersed in water, and an air pressure of 100 kPa was then applied to the hollow portions. The hollow fiber membranes were then checked for leakage. No air leakage was found on the hollow fiber membranes. The hollow fiber membranes were found not to be cut.

Then, the small bundles were cut out of the tube, and the interior of the tube was closely observed. No damage was found on the hollow fiber membranes in the tube. Furthermore, for all of 30 tubes tested, the tip of the coating layer of the casting resin coating the hollow fiber membranes was positioned closer to the first fixing layer than the filtration portion interface of the second fixing layer.

Referential Example 1

Drop tests were carried out as in the case of Example 6 using a hollow fiber membrane module produced in the same manner as in Example 2.

After the drop tests, the hollow fiber membrane module was immersed in water, and an air pressure of 100 kPa was applied to the hollow portions. Then, bubbles were found to flow out from the tube.

The small bundles were cut out of the tube from which the bubbles had flown out. The interior of the tube was closely observed. As a result, the hollow fiber membranes were found to be broken at the coating portion of the casting resin coating the hollow fiber membranes. The tip of the coating layer was positioned closer to the center of the module than the filtration portion interface of the first fixing layer.

A comparison between Example 6 and Referential Example 1 clearly indicates that if the position of the filtration portion interface of the fixing layer outside each of the elastic bodies is closer to the center of the module than the position of the tip of the casting resin coating the outer surface of the hollow fiber membranes in the elastic body, the hollow fiber membranes are prevented from being damaged even when the module is subjected to an external impact force.

Example 7

An example of an immersion hollow fiber membrane cartridge module will be described in which a heat-shrinkable film was used as an elastic body and every hollow fiber membrane was covered with the elastic body.

The heat-shrinkable film used was a polyethylene porous membrane obtained by uniaxial stretching as described in Example 9 of JP-A-62-58813. The heat-shrinkable film had a porosity of 60% and a film thickness of 90 µm. When heated to 120° C., the heat-shrinkable film exhibited a maximum shrinkage factor of 70% in the stretching direction.

Each of the hollow fiber membranes was a microfiltration membrane made of polyvinylidene fluoride and having an outer diameter of 1.7 mm, an inner diameter of 0.9 mm, and a pore size of 0.1 µm.

First, the end of each of the hollow fiber membranes was heated and fused to occlude the hollow portion. A heat-shrinkable film of width 50 mm and length 800 mm was placed on a tray. One hundred hollow fiber membranes described above were arranged parallel to one another at a pitch of 7 mm so that a portion of each hollow fiber membrane spanning 20 to 70 mm from the end thereof was positioned on the film. Then, another heat-shrinkable film was placed on the hollow fiber membranes at a position corresponding to the above-described heat-shrinkable film. Thereafter, heaters were applied to the intermediate portion of each of the hollow fiber membranes from the external sides of the respective two heat-shrinkable films, which were then pressurized. The two heat-shrinkable films were then heated and fused. Each of the resulting fused portions was 2 mm in width. The tray as a whole was then placed in an oven and heated to 120° C. to shrink the heat-shrinkable films. These operations were performed on both ends of the hollow fiber membranes. Thus, every hollow fiber membrane was covered with the elastic body so that the elastic body was in tight contact with the outer circumference of the hollow fiber membrane. Then, a sheet-like hollow fiber membrane bundle was successfully produced in which the distance between the adjacent elastic bodies was kept at 2 mm.

Furthermore, the heat-shrinkable films were heated and shrunk with length-wise opposite ends of the films gripped so that the shrinkage factor of the films was the same as that during the above-described operations. The shrunk heat-shrinkable films measured 40 A in hardness. The hardness was measured with a plurality of the films stacked so as to be 10 mm in thickness.

Five sheet-like hollow fiber membranes described above were arranged parallel to one another with a spacer of thickness 2 mm placed between the hollow fiber membranes. A first fixing layer was formed by a stationary casting method using a first casting resin (a urethane resin exhibiting a hardness of 50D after curing and a viscosity of 600 mPa·s during the initial period of mixture) for the both ends of the hollow fiber membranes. Moreover, a second fixing layers of thickness 10 mm were formed on the both first fixing layers by the stationary casting method using a second casting resin (a urethane resin exhibiting a hardness of 65 A after curing and a viscosity of 2,200 mPa·s during the initial period of mixture). The fixing layers had a width of 30 mm and a length of 400 mm. The total thickness of the first and second fixing layers was 40 mm. Then, the ends of both fixing portions were cut to open the hollow portions of the hollow fiber membranes. Thereafter, a cap with a nozzle through which filtrate flows is placed on and bonded to each of the fixing layers. As a result of the above-described operations, an immersion hollow fiber membrane cartridge module was obtained in which the hollow portions were open at the opposite ends thereof. The module had an effective length of 1.5 m and a membrane area of 4 m². The portion covering each of the hollow fiber membranes had a projection length of 30 mm.

Six immersion hollow fiber membrane cartridge modules produced as described above were arranged parallel to one another at a pitch of 5 cm and then fixed. The nozzle of the cap of each of the modules was connected to the collection line of the filtration apparatus. The modules were then immersed in an activated sludge tank similar to that in Example 1. An air diffusion line was provided in the gap between the modules and below the lower end of each of the modules. In the present example, the "pitch" means the distance between the centers of the hollow fiber membranes or the modules.

Suction filtration was performed for three months under conditions similar to those in Example 1. During this period, the transmembrane pressure difference was −10 to −15 kPa, resulting in a very stable operation. Three months later, no sludge was found to adhere to the hollow fiber membranes. The total weight of the six hollow fiber membrane modules including adhering sludge was 200 g heavier than that measured at the beginning of the filtration. No sludge accumulated between the elastic bodies.

Furthermore, the distance between the adjacent elastic bodies was kept at 2 mm and thus remained unchanged after the filtration operation. The projection length from the filtration portion interface also remained unchanged for all the elastic bodies.

No fiber breakage occurred near the fixing layers at the opposite ends of the module. The portion of the hollow fiber membrane covered with the elastic body was disassembled and checked. Then, in the fused portion, a coating layer was found on the outer surface of the hollow fiber membrane; the coating layer is expected to be formed by climbing of the first casting resin. The tip of the coating layer was positioned between the first fixing layer and the second fixing layer.

REFERENCE SIGNS LIST

1 Hollow fiber membrane bundle
2 Head
3 Skirt
4 Head-side first fixing layer
5 Skirt-side first fixing layer
6 End surface of head-side first fixing layer
7 End surface of skirt-side first fixing layer
8 Through-hole
9 End of skirt
10 Small bundle
11 Support material
12 Filtration portion
13 Head-side second fixing layer
13' Position of filtration portion interface of head-side second fixing layer
14 Skirt-side second fixing layer
14' Position of filtration portion interface of skirt-side second fixing layer
15 Elastic body
16 Porous plate
17 Angle of inclination of filtration portion interface
18 Projection length from filtration portion interface
19 Distance between elastic bodies
21 Hollow fiber membrane
31 Tip of coating layer of casting resin 50 Heat-shrinkable film
50' Heat-shrinkable film
51 Fused portion of heat-shrinkable film
100 Hollow fiber membrane module
110 Cage-like cylinder
120 Cylinder
121 Through-hole
200 Open water tank
300 Collection line
400 Air introduction line
500 Raw water supply line
510 Raw water supply port
610 Concentrated water discharge port
700 Module case
800 Pressurization tank

The invention claimed is:

1. A hollow fiber membrane module having no external cylinder covering the outer circumference of the hollow fiber membrane bundles and having fixing layers to which one or a plurality of hollow fiber membrane bundles each comprising a plurality of hollow fiber membranes are fixed at respective ends thereof using a casting resin, a hollow portion of each of the hollow fiber membranes being open at one or both of the ends,
wherein the hollow fiber membrane bundle is divided into a plurality of small bundles at at least one of the fixing layers on an open side of the hollow portion, an outer circumference of each of the small bundles is covered with an elastic body, a part of the elastic body is buried in the fixing layer, and a remaining part of the elastic body projects from a filtration portion interface of the fixing layer, and a length by which the elastic body projects from the filtration portion interface is 5 mm to 100 mm, and a position of the filtration portion interface of the fixing layer outside the elastic body is closer to a center of the module than a position of a tip of the casting resin coating an outer surface of the hollow fiber membrane in the elastic body, and
wherein the elastic body comprises a heat-shrinkable material that is shrunk to remain in tight contact with the hollow fiber membranes, and also the shape of the elastic body is fixed with no clamping force exerted on the hollow fiber membranes.

2. The hollow fiber membrane module according to claim 1, wherein a distance between elastic bodies closest to each other at the portion projecting from the filtration portion interface is 2 mm to 80 mm.

3. The hollow fiber membrane module according to claim 1, wherein the filtration portion interface of the fixing layer on a side on which the elastic body is provided is inclined to a fiber length direction of the hollow fiber membrane bundles.

4. The hollow fiber membrane module according to claim 1, wherein the elastic body is shaped like a tube.

5. The hollow fiber membrane module according to claim 1, wherein the heat-shrinkable material exhibits a hardness of 40 A to 90 A after heat shrinkage.

6. An immersion hollow fiber membrane cartridge module using the hollow fiber membrane module according to claim 1.

7. A pressurization hollow fiber membrane cartridge module using the hollow fiber membrane module according to claim 1.

8. A hollow fiber membrane module according to claim 1, wherein said heat-shrinkable material is shrunk when heated to 50° C. to 150° C.

9. A hollow fiber membrane module according to claim 1, wherein said heat-shrinkable material is an EPDM containing heat-shrinkable tube or an olefin containing heat-shrinkable film.

10. A hollow fiber membrane module according to claim 9, wherein said heat-shrinkable material is shaped like a tube and the inner diameter before shrinkage of the heat-shrinkable tube is at least 1.05 times and at most triple relative to the outer diameter of the hollow fiber membrane bundle.

11. A hollow fiber membrane module according to claim 1, wherein said heat-shrinkable material is shaped like a tube and the inner diameter before shrinkage of the heat-shrinkable tube is at least 1.05 times and at most triple relative to the outer diameter of the hollow fiber membrane bundle.

12. A hollow fiber membrane module having no external cylinder covering the outer circumference of the hollow fiber membrane bundles and having fixing layers to which a plurality of hollow fiber membranes are fixed at respective ends thereof using a casting resin, a hollow portion of each of the hollow fiber membranes being open at one or both of the ends,
wherein an outer circumference of each of the hollow fiber membranes is covered with an elastic body at at least one of open sides of the hollow portion, a part of the elastic body is buried in the fixing layer, and a remaining part of the elastic body projects from a filtration portion interface of the fixing layer, a length by which the elastic body projects from the filtration portion interface is 5 mm to 100 mm and a position of the filtration portion interface of the fixing layer outside the elastic body is closer to a center of the module than a position of a tip of the casting resin coating an outer surface of the hollow fiber membrane in the elastic body, and
wherein the elastic body comprises a heat-shrinkable material that is shrunk to remain in tight contact with the hollow fiber membrane, and also the shape of the elastic body is fixed with no clamping force exerted on the hollow fiber membrane.

13. The hollow fiber membrane module according to claim 12, wherein a distance between elastic bodies closest to each other at the portion projecting from the filtration portion interface is 2 mm to 80 mm.

14. The hollow fiber membrane module according to claim 12, wherein the filtration portion interface of the fixing layer on a side on which the elastic body is provided is inclined to a fiber length direction of the hollow fiber membrane bundles.

15. The hollow fiber membrane module according to claim 12, wherein the elastic body is shaped like a tube.

16. The hollow fiber membrane module according to claim 12, wherein the heat-shrinkable material exhibits a hardness of 40 A to 90 A after heat shrinkage.

17. An immersion hollow fiber membrane cartridge module using the hollow fiber membrane module according to claim 12.

18. A pressurization hollow fiber membrane cartridge module using the hollow fiber membrane module according to claim 12.

19. A hollow fiber membrane module according to claim 12, wherein said heat-shrinkable material is shrunk when heated to 50° C. to 150° C.

20. A hollow fiber membrane module according to claim 12, wherein said heat-shrinkable material is an EPDM containing heat-shrinkable tube or an olefin containing heat-shrinkable film.

21. A hollow fiber membrane module according to claim 20, wherein said heat-shrinkable material is shaped like a tube and the inner diameter before shrinkage of the heat-shrinkable tube is at least 1.05 times and at most triple relative to the outer diameter of the hollow fiber membrane.

22. A hollow fiber membrane module according to claim 12, wherein said heat-shrinkable material is shaped like a tube and the inner diameter before shrinkage of the heat-shrinkable tube is at least 1.05 times and at most triple relative to the outer diameter of the hollow fiber membrane.

* * * * *

UNITED STATES PATENT AND TRADEMARK OFFICE
CERTIFICATE OF CORRECTION

PATENT NO. : 8,679,337 B2  
APPLICATION NO. : 12/993291  
DATED : March 25, 2014  
INVENTOR(S) : Y. Ishibashi et al.

Page 1 of 1

It is certified that error appears in the above-identified patent and that said Letters Patent is hereby corrected as shown below:

Title Page, Item (57)/Abstract, line 8, please change "bundles at least" to -- bundles at at least --

Signed and Sealed this  
Ninth Day of December, 2014

Michelle K. Lee  
*Deputy Director of the United States Patent and Trademark Office*